United States Patent [19]

Suzuki et al.

[11] Patent Number: 5,676,851

[45] Date of Patent: Oct. 14, 1997

[54] METHOD OF MAKING A CAPACITANCE TYPE ACCELERATION SENSOR

[75] Inventors: Masayoshi Suzuki, Hitachioota; Takao Sasayama, Hitachi; Keizi Hanzawa; Norio Ichikawa, both of Mito; Junichi Horie, Hitachinaka; Yukiko Sugisawa, Hitachinaka; Yuuji Ogasawara, Hitachinaka, all of Japan

[73] Assignees: Hitachi Ltd., Tokyo; Hitachi Automotive Engineering Co., Ltd., Ibaraki, both of Japan

[21] Appl. No.: 723,875

[22] Filed: Sep. 23, 1996

Related U.S. Application Data

[62] Division of Ser. No. 364,098, Dec. 27, 1994, Pat. No. 5,616,844.

[30] Foreign Application Priority Data

Dec. 27, 1993 [JP] Japan .................. 5-331003

[51] Int. Cl.$^6$ ............... B44C 1/22; H01L 21/00
[52] U.S. Cl. ............... 216/2; 216/33; 437/927; 437/228 SEN
[58] Field of Search ............... 156/633.1, 657.1; 216/2, 33; 437/228 H, 228 SEN, 927; 73/514.32

[56] References Cited

U.S. PATENT DOCUMENTS

| | | |
|---|---|---|
| 4,783,237 | 11/1988 | Aine et al. ............... 156/647.1 X |
| 5,095,570 | 3/1992 | Suzuki et al. |
| 5,389,198 | 2/1995 | Koide et al. ............... 216/2 |
| 5,417,312 | 5/1995 | Tsuchitani ............... 73/517 AV |

FOREIGN PATENT DOCUMENTS

| | | |
|---|---|---|
| 1-253657 | of 1988 | Japan . |
| 1620944 | 1/1991 | U.S.S.R. ............... 73/514.32 |

Primary Examiner—William Powell
Attorney, Agent, or Firm—Evenson McKeown Edwards & Lenahan PLLC

[57] ABSTRACT

A capacitance acceleration sensor and method of making same are disclosed. A capacitance acceleration sensor includes a movable electrode etched from a silicon plate which is clamped between two solid dielectric plate members of glass, silicon oxides, or oxygen oxides. Static electrodes are secured to surfaces of the dielectric members facing opposite the movable electrode, thereby providing easy manufacturing assessibility for leadout wires from these electrodes. In certain embodiments, the movable electrode is formed integrally with a monocrystalline silicon plate member which also contains an integrated circuit for generating an output acceleration signal in response to movement of the movable electrode when the assembly experiences acceleration forces.

3 Claims, 5 Drawing Sheets

5,676,851

METHOD OF MAKING A CAPACITANCE TYPE ACCELERATION SENSOR

This is a divisional of application Ser. No. 08/364,098, filed Dec. 27, 1994, U.S. Pat. No. 5,616,844.

BACKGROUND AND SUMMARY OF THE INVENTION

The present invention relates to a capacitance type acceleration sensor. Such capacitance type acceleration sensors can be mounted on a vehicle and serve to control vehicle systems in response to sensed acceleration conditions, such as a vehicle air-bag deployment system and a vehicle driving and braking system.

Various types of acceleration sensors have been proposed in the past, including pressure type sensors and strain gage type sensors. Capacitance type acceleration sensors of the type contemplated by the present invention exhibit excellent accuracy characteristics over wide temperature ranges.

Commonly owned U.S. Pat. No. 5,095,752 discloses a capacitance type accelerometer of the type the invention is directed toward improving. The contents of this U.S. Pat. No. 5,095,752 are incorporated herein by reference thereto for the purpose of showing the background of the present invention and the basic operating principals of capacitance type acceleration sensors. Published Japanese patent application 1-253657 also relates to a prior art capacitance type acceleration sensor. Reference is also made to a publication titled Semiconductor Capacitance-Type Accelerometer With PWM Electrostatic Servo Technique, presented at the SAE International Congress and Exposition, Detroit, Mich., Feb. 25–Mar. 1, 1991, printed as SAE Technical Paper Series 910274, for a discussion of capacitance type acceleration sensors which the present invention is directed toward improving.

FIG. 1 schematically depicts a circuit diagram for a conventional capacitance type acceleration sensor of the type referred to above, and FIG. 2 schematically depicts a prior art detecting unit or gage unit for the FIG. 1 sensor system. Referring to FIG. 1, acceleration G is detected with a detecting unit ("gage unit") 1, the signal being fed to an electronic circuit 2 for detecting electrostatic capacitance changes ($\Delta C$), the output of which circuit 2 is further processed with a holding circuit 3 and an adjusting circuit 4 to obtain an output voltage $V_o$ at terminal 13 which is directly proportional to the acceleration G.

The gage unit 1 has a movable electrode 5 serving as a weight interposed between upper and lower static electrodes 6 and 7, the movable electrode 5 being supported at a bendable beam between the static electrodes 6 and 7.

Since the static electrodes 6 and 7 and the movable electrode 5 are facing each other in substantially planar relationship, there exists electrostatic capacitances $C_1$ and $C_2$ therebetween, the values of these capacitances $C_1$ and $C_2$ being fed to one of the terminals of an operation amplifier 10 of the AC detector unit 2.

When an acceleration G is applied to the gage unit 1, the movable electrode 5 is moved by inertia due to the acceleration (upward or downward as seen in the FIG. 1 illustration). Therefore, the distance between the movable electrode 5 and each of the electrodes 6 and 7 has changed with consequent changes in the electrostatic capacitances $C_1$, $C_2$. The AC detector unit 2 operates so as to detect the differences $C_1$–$C_2$ ($\Delta C$) using both generators 8, 9, a capacitor 11 for charge integration and a switch 12 for discharging. A voltage directly proportional to $\Delta C$ is obtained from the amplifier 10 as an output. Since the voltage is not always kept constant over time due to the effect of the detecting operation described above, the holding circuit 3 is provided to modulate the voltage and provide an analog voltage $V_o$ directly proportional to the acceleration G. Since the present invention is not directly related to the details of the operation of this circuit, further details of the operation of this AC detector unit 2 are not included herein, reference being made to the above noted prior art publications, and other prior art disclosures readily available to those skilled in the art.

FIG. 2 shows a prior art structure of a conventional gage unit 1 for use with the system of FIG. 1, the FIG. 2 gage unit 1 being similar to the FIG. 25 embodiment of the above-mentioned U.S. Pat. No. 5,095,572. Referring to FIG. 2, a movable electrode comprises a weight 5 which serves as the movable electrode for detecting capacitance. The weight 5 is supported by way of an integrally formed beam 14 and weight support 20 (weight support portion 21 is also part of the weight support connected to the weight support 20 in front and back of the plane of the FIG. 2 illustration and not shown in this Figure). Weight support 20, 21 is fixed to support members of glass plates 22 and 23 disposed at the top and bottom thereof as shown in the illustration of FIG. 2.

A static electrode 6 is placed on the side of the glass plate 22 facing the movable electrode 5 and is connected to an external electrode 16 through a through hole 15 formed by boring a hole through the glass plate 22. The structure of the glass plate 23 at the lower side is similar with a static electrode 7 placed on the side of the glass plate 23 facing the movable electrode 5 which static electrode 7 is connected to an external electrode 19 by way of a through hole 17 formed by boring a hole in the glass plate 23.

A problem with the prior art capacitance type acceleration sensor described above is that technical difficulties are encountered in precisely forming the through holes in the glass plates for extending lead wires out from the static electrodes and in attaching the lead wires. These difficulties have created significant problems in the production of sensors of this type.

An object of the present invention is to provide a capacitance type acceleration sensor of the general type described above, but where the connection of the lead wires to the static electrodes is greatly simplified. Another object of the present invention is to provide a capacitance type acceleration sensor of the above-noted type, wherein the detector circuit and the movable electrode are incorporated together as a single unit. A further object of the present invention is to provide new and improved methods of manufacturing a capacitance type acceleration sensor. These and other objects are achieved according to the present invention by providing a capacitance type acceleration sensor comprising a movable electrode which is movable in response to acceleration, a first static electrode facing the movable electrode, and a first solid dielectric member disposed between the movable electric and the first static electrode. In this sensor arrangement, the solid dielectric member serves to position and support the static electrode, without requiring that a hole be drilled through the solid dielectric member as is the case with prior art arrangements discussed above.

In especially preferred embodiments, the movable electrode is formed on a silicon plate member which is supported between plates or sheets which form first and second solid dielectric members that also support respective static electrodes on their respective sides facing away from the movable electrode. In this manner, the silicon plate member serving as the movable electrode is reliably supported in position between the solid dielectric members and the static electrodes are reliably connected to the solid dielectric members.

In especially preferred embodiments, the above-mentioned object of achieving a simpler construction with the unitary movable plate member and detector circuit, the capacitance type acceleration sensor comprises a unitary monocrystalline plate member with a movable cantilever plate portion forming a movable electrode which is movable in response to acceleration, a first static electrode facing the movable electrode, and an integrated circuit in said unitary plate member for forming an analog signal reflecting acceleration forces based on changes in capacitance between the movable cantilever plate portion and the first static electrode.

The preferred methods of making the capacitance of the acceleration sensor utilize the unique configuration with the static electrodes mounted on sides of the dielectric support members facing away from the movable electrode. Also, with unitary monocrystalline plate members forming the movable electrode and containing the integrated circuit for processing changes in capacitance caused by acceleration induced movement of the movable electrode to generate output signals correspondingly to acceleration of a vehicle carrying the sensor.

Other objects, advantages and novel features of the present invention will become apparent from the following detailed description of the invention when considered in conjunction with the accompanying drawings.

DETAILED DESCRIPTION OF THE INVENTION

Figure 2:
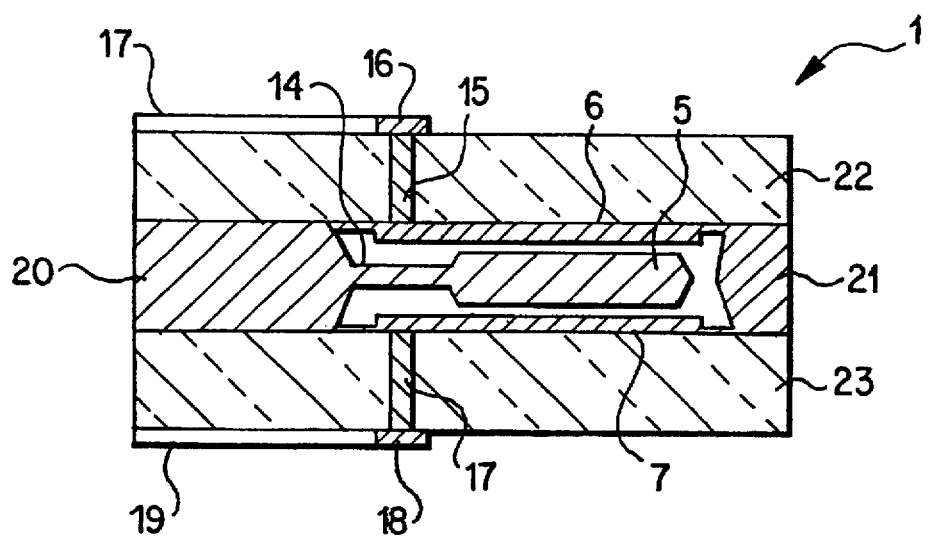
FIG. 2 is a sectional view depicting a gage unit for the sensor of FIG. 1.
Figure 3:
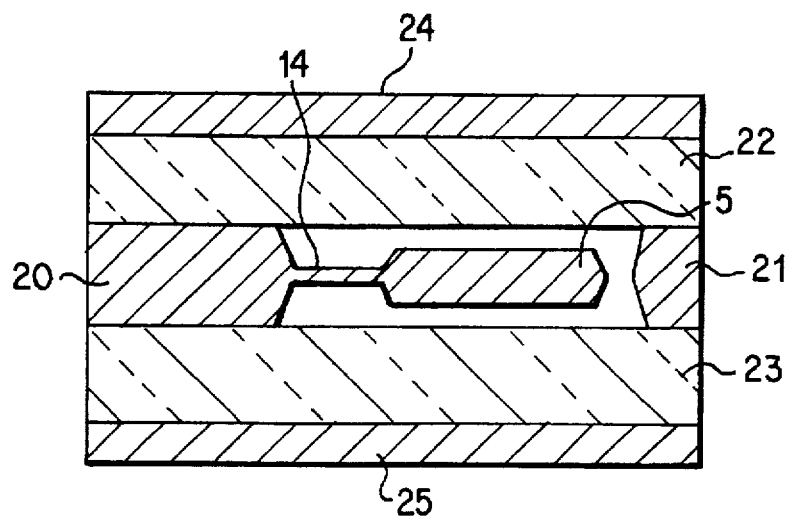
FIG. 3 is a sectional view showing a first embodiment of an acceleration sensor gage unit constructed in accordance with the present invention.

A first embodiment according to the present invention will be described below, referring to FIG. 3. In FIG. 3, the elements having the same constructions as in the prior art FIGS. 1 and 2 drawings described above are identified by the same numerals. Although the movable electrode unit in FIG. 3 is constructed with a movable electrode 5, a beam 14, a weight supporting portion 20 and a Height supporting portion 21, the static electrodes are composed of only the members indicated by the numerals 24 and 25 without the members indicated by the numerals 6, 7, 15, 16 in FIG. 2. With this construction, the traditional detection of electrostatic capacitance can be performed, and the variation in the electrostatic capacitance between the weight 5 of the movable electrode portion and the static electrode 24 (or 25) can certainly be detected.

Figure 3A:
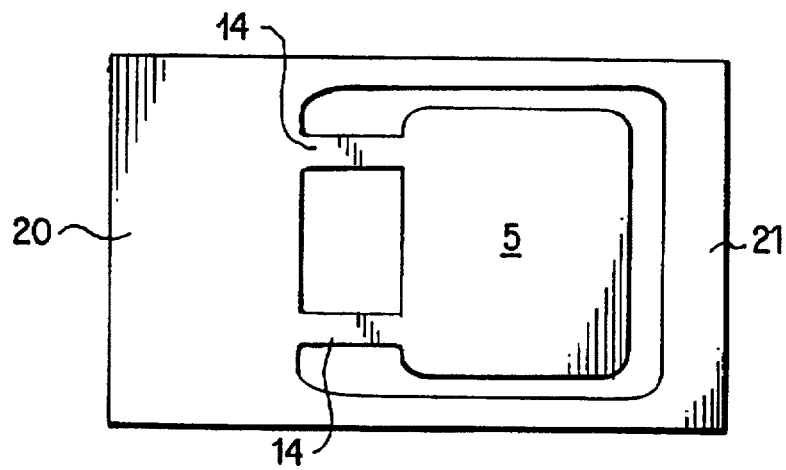
FIG. 3A is a schematic top view depicting the cantilever arm arrangement for the beams supporting the movable electrode of the embodiment of FIG. 3.

FIG. 3A is a top view schematically depicting the double cantilever arm arrangement for the beams 14 supporting the movable electrode 5. The movable electrode 5, cantilever support beams 14 and weight supporting portions 20 and 21 are all formed from a single silicon plate. The length of the cantilever arms 14 as compared to the length of the movable electrode 5 is such that the movable electrode 5 moves in substantially planar relationship with respect to the static electrodes 24 and 25. In certain contemplated preferred embodiments, the effective lever arm of the cantilevers 14 is about 2000 μm (micrometers) and the gap between the movable electrode 5 and the dielectric support plates 22 or 23 is about 4 μm, and the thickness of the dielectric plates 22 and 23 is about 400 μm.

In especially preferred embodiments, the dielectric plates 22 and 23 are made of one of the materials including glass, silicon dioxide and silicon nitride. For certain applications, the silicone oxide and silicon nitride material is preferred since sodium in glass can cause some deterioration in the operation. In preferred embodiments, the electrodes 24 and 25 are made of aluminum sheets bonded to the dielectric plates.

By placing the dielectric plates 22, 23 between the movable electrode and the static electrodes 24, 25, the sensitivity efficiency of the capacitance gage unit is substantially reduced as compared with the prior art arrangement described above with respect to FIG. 1. However, the present inventors have discovered that, in spite of this substantial reduction in capacitance detection efficiency due to the more remote location of the fixed electrodes, the arrangement of the present invention with the dielectric material between the movable electrode and the fixed electrodes sufficiently enhances the production techniques, especially regarding the reliability and simplicity of connecting the fixed electrodes to the remaining circuit system, while still providing sufficient capacitance change detection facility as to provide a substantially improved acceleration sensor.

Figure 1:
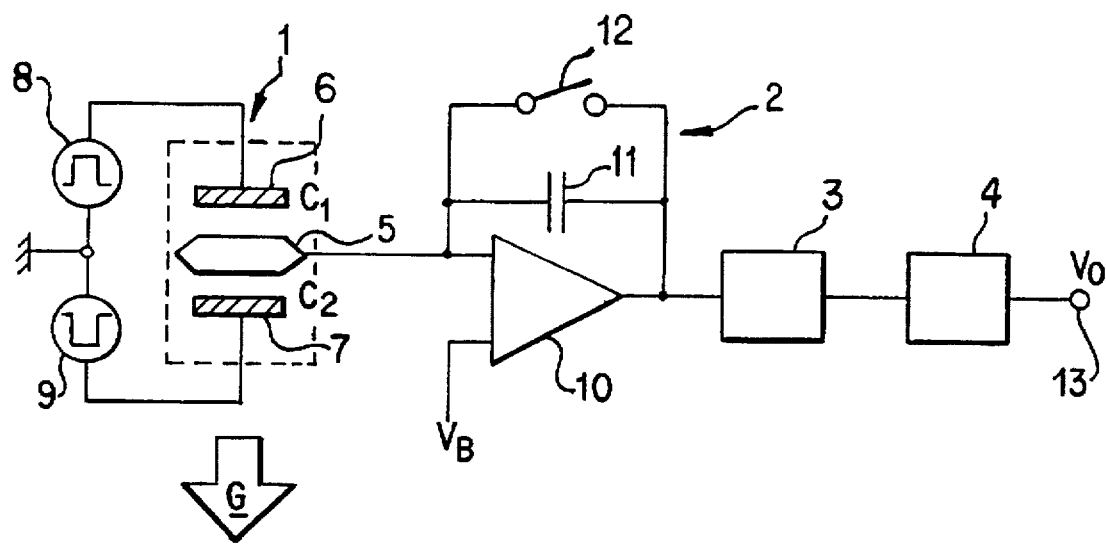
FIG. 1 is a schematic depiction of a prior art capacitance type acceleration sensor system.
Figure 4:
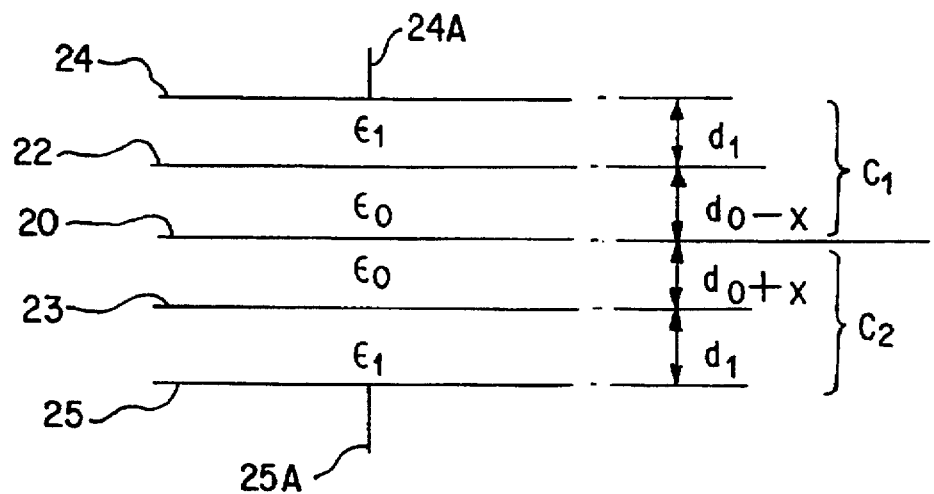
FIG. 4 is a diagram depicting the electrical equivalent circuit of the gage unit of FIG. 3.

The equivalent circuit for the electrostatic capacitance in the structure shown in FIG. 1 can be expressed as shown in FIG. 4. In FIG. 4, lead wires 24A and 25A are connected respectively to the static electrodes 24 and 25. The symbol $d_1$ is the thickness of the glass plate, the symbol $d_o$ being the initial distance of the gap between the weight 5 and the glass plate 22 (23), the symbol x being the displacement in the distance of the gap due to applying an acceleration, the symbol $\epsilon_o$ being the dielectric constant of vacuum, the symbol $\epsilon_1$ being the dielectric constant of the glass. Using these values, the electrostatic capacitance $C_1$ between the equivalent external electrode 24 and the weight 5 is expressed as follows:

$$C_1 = \epsilon_o S / \{d_o + (\epsilon_o/\epsilon_1)d_1\} - x] \quad \text{(Equation 1)}$$

The symbol S is the effective area of the electrostatic capacitance in the weight portion serving as the movable electrode against the electrode 24. It can be understood from the above equation that when a displacement in gap x takes place due to applying an acceleration, the electrostatic capacitance $C_1$ varies and the acceleration, therefore, can be obtained by measuring the magnitude of $C_1$.

On the lower electrode, a similar phenomenon occurs (the gap displacement is opposite), and the capacitance $C_2$ can be expressed as follows:

$$C_2 = \epsilon_o S/[\{d_o + (\epsilon_o/\epsilon_1)d_1\} + x] \qquad \text{(Equation 2)}$$

Figure 5:
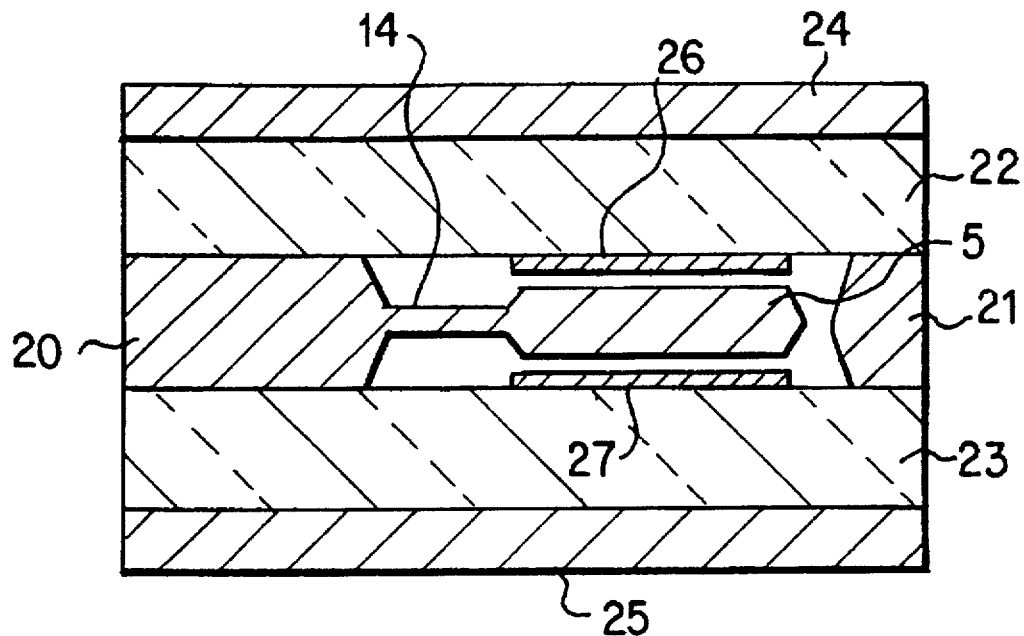
FIG. 5 is a sectional view showing a second embodiment of an acceleration sensor gage unit constructed in accordance with the present invention.

FIG. 5 shows a second embodiment according to the present invention. In this case, additional electric conductive portions 26, 27 are provided in connection with the weight portion 5. By doing so, the dielectric flux determining the electrostatic capacitances $C_1$ and $C_2$ is focused on the static electrodes 24 and 25. In other words, the members 26 and 27 have an electrode function of focusing dielectric flux. Consequently, the detecting accuracy can be improved. Otherwise, the embodiment of FIG. 5 is similar to FIG. 3 with the fixed electrodes 24 and 25 supported on dielectric plates 22 and 23.

Figure 6:
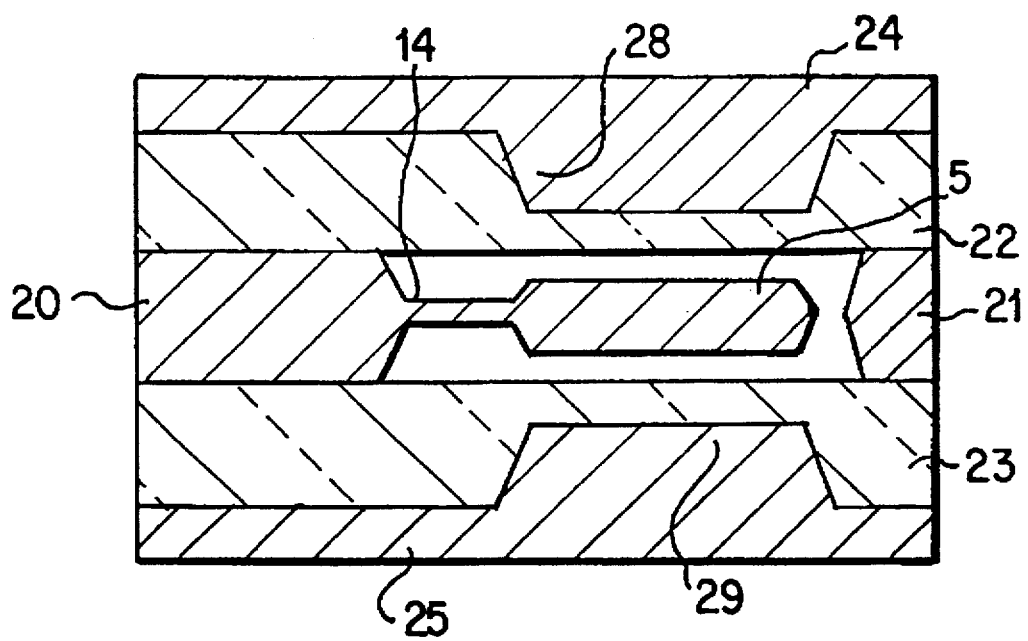
FIG. 6 is a sectional view showing a third embodiment of an acceleration sensor gage unit constructed in accordance with the present invention.

FIG. 6 shows a further embodiment according to the present invention. In this embodiment a part 28 (29) of the static electrode 24 (25) is so constructed as to be varied in its thickness (protruded) toward the glass 22 (23) side corresponding to the movable electrode 5. In this case, since the distance between the electrodes is shortened, the electrostatic capacitance $C_1$ ($C_2$) is hardly affected by the glass and the accuracy can be improved. Further, since machining of the glass plate is comparatively easy, the production cost of the sensor can be decreased.

Figure 7:
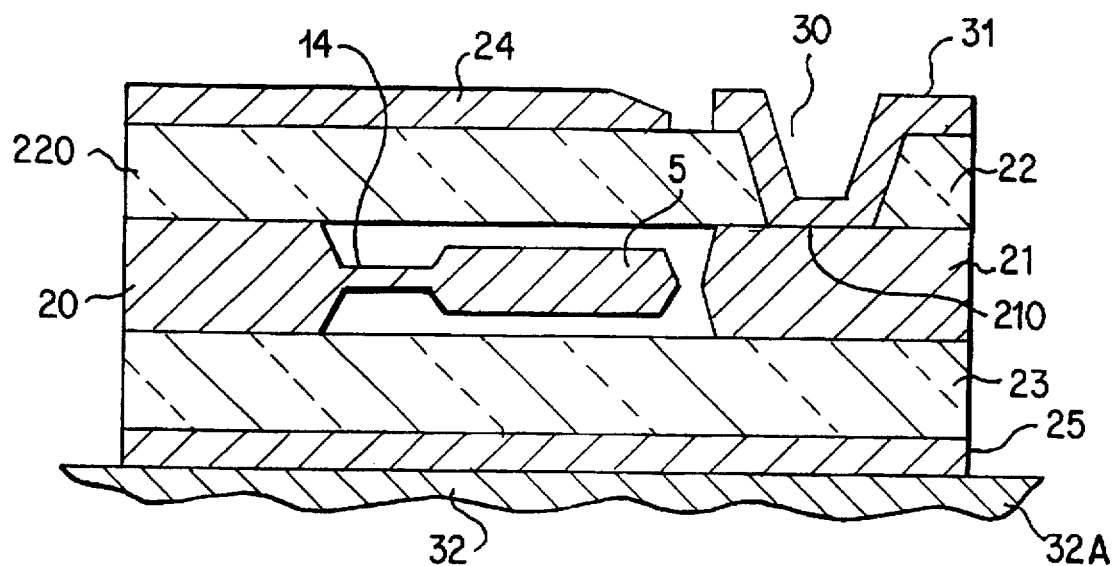
FIG. 7 is a sectional view showing a fourth embodiment of an acceleration sensor gage unit constructed in accordance with the present invention.

FIG. 7 shows a still further embodiment according to the present invention. The figure shows the method for leading out wires from three electrodes (one movable electrode, two static electrodes) and the method for electric connection including the structure. The wire for the upper static electrode is led out from the portion 24, an electric conductive member 32 being attached to the bottom surface of the lower static electrode 25 (it is easy to fabricate the electric conductive member similar to fabrication of an electric conductive member of ceramic substrate used for hybrid IC or the like), the wire being led out from the portion 32A. Further an indenting portion 30 is formed in the glass plate 22 for the static portion 21 of the movable electrode, a conductive member 31 being passed through the indenting portion to utilize as an electrode. This embodiment has an advantage in that it is easy to connect to a circuit.

Figure 8:
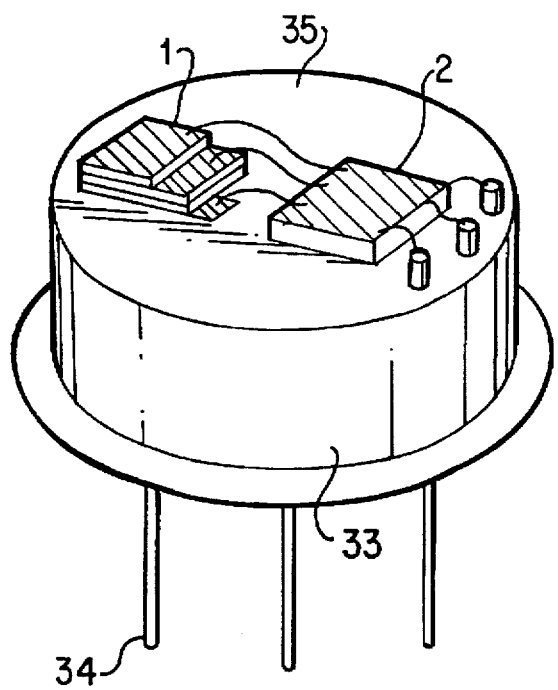
FIG. 8 is a sectional view showing a fifth embodiment of an acceleration sensor gage unit constructed in accordance with the present invention.

FIG. 8 shows a further embodiment according to the present invention. In this embodiment, a gage 1 and an IC chip 2 containing a ΔC detector, a holding circuit, an adjusting circuit and so on are sealed in a can package 33, an output signal being put out as an output $V_o$ of the sensor through a terminal 34. The gage 1 has a three layer structure, each of the layers being connected in circuit bases to the chip 2 with a connecting wire. Since in the embodiment the gage and the IC are surrounded with the metallic can, the sensor is hardly affected with electromagnetic interference from the external of the package.

Figure 9:
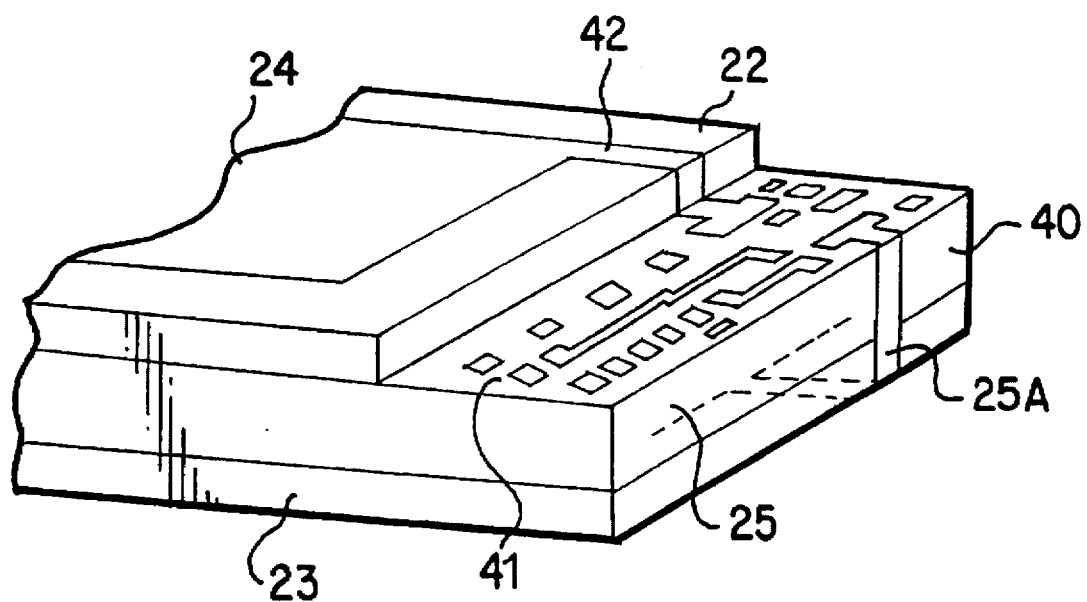
FIG. 9 is a sectional view showing a sixth embodiment of an acceleration sensor gage unit constructed in accordance with the present invention.

FIG. 9 shows another embodiment according to the present invention. In this embodiment, a gage and an IC circuit are formed on a single silicon substrate 40. The IC circuit 41 is formed and integrated on the substrate 40. The fabrication can be performed with a semiconductor fabrication process for common IC. The static electrodes 23, 24 are connected to an IC circuit 41 by using lead wires 42, 25A.

In this embodiment of FIG. 9, since the length of lead wires for connection can be shortened comparing to the embodiments described above, the accuracy in detecting capacitance can be improved. Further, since the IC circuit and the static electrodes 23, 24 are placed close to each other, leak capacitance between both electrodes is decreased and the sensor is hardly affected by external factors such as (temperature and humidity, electro-magnetic interference, effect of external equipments and so on). Especially, since the lead wires 42, 25A are shorted and the static electrode surface has an effective electro-magnetic shielding function, there is a large effect against electro-magnetic interference and electric induction.

According to the present invention, it becomes easy to lead out from the static electrodes, the reliability of the sensor can be increased and the fabrication process can be simplified.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of making a capacitance type acceleration sensor, comprising:

etching a silicon plate to form a cantilever supported movable electrode connected to rigid support parts of the silicon plate, attaching a first solid dielectric member plate to one side of the silicon plate rigid support parts, attaching a first static electrode to said first dielectric plate to a side of said first dielectric plate which faces away from the movable electrode, and attaching an electrical lead line to the first static electrode.

2. A method according to claim 1, comprising:

attaching a second solid dielectric member plate to a side of the silicon plate opposite said one side, attaching a second static electrode to said second solid dielectric plate at a side of said second dielectric plate which faces away from the movable electrode, and attaching a second electrical lead line to the second static electrode.

3. A method of making a capacitance type acceleration sensor comprising:

etching a silicon plate to form a cantilever supported movable electrode connected to rigid support parts of the silicon plate, disposing a first fixed electrode in facing relation to the movable electrode, and forming an integrated circuit in said silicon plate for generating an electrical output signal representative of capacitance changes caused by relative movement of the movable electrode and the first fixed electrode.

* * * * *